(12) United States Patent
Murata

(10) Patent No.: US 9,467,085 B1
(45) Date of Patent: Oct. 11, 2016

(54) MONITORING VIBRATION MOTOR INDUCED VOLTAGE SLOPE TO CONTROL HAPTIC FEEDBACK

(71) Applicant: SEMICONDUCTOR COMPONENTS INDUSTRIES, LLC, Phoenix, AZ (US)

(72) Inventor: Tsutomu Murata, Mizuho (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/670,301

(22) Filed: Mar. 26, 2015

(51) Int. Cl.
*H02K 33/00* (2006.01)
*H02P 1/00* (2006.01)
*H02P 3/00* (2006.01)
*H02P 25/02* (2016.01)
*H02P 3/02* (2006.01)

(52) U.S. Cl.
CPC ............... *H02P 25/027* (2013.01); *H02P 3/02* (2013.01)

(58) Field of Classification Search
CPC ................. H02P 25/027; H02P 3/02
USPC .......................................................... 318/114
See application file for complete search history.

(56) References Cited

U.S. PATENT DOCUMENTS

| 2010/0153845 | A1* | 6/2010 | Gregorio | G06F 3/016 715/702 |
| 2010/0231147 | A1* | 9/2010 | Milesi | H02P 6/24 318/375 |
| 2012/0229264 | A1* | 9/2012 | Company Bosch | G06F 3/016 340/407.1 |
| 2014/0118126 | A1* | 5/2014 | Garg | G06F 3/016 340/407.1 |

* cited by examiner

*Primary Examiner* — Erick Glass
(74) *Attorney, Agent, or Firm* — Conley Rose, P.C.

(57) ABSTRACT

A method for controlling haptic feedback in an electronic device, in some embodiments, comprises: generating a series of braking pulses to stop vibrations generated by a vibration motor in the electronic device; during a high impedance period between at least one pair of pulses in said series of braking pulses, determining a rate of change of an induced voltage associated with the vibration motor; and if said rate of change meets a requirement, ceasing said generation of the series of braking pulses.

20 Claims, 4 Drawing Sheets

MONITORING VIBRATION MOTOR INDUCED VOLTAGE SLOPE TO CONTROL HAPTIC FEEDBACK

BACKGROUND

Various electronic devices use haptic feedback systems to enhance the user experience. Smart phones, for example, often contain haptic feedback systems that create a vibrating or "buzzing" sensation in response to a user's finger touching a touch screen display. Such haptic feedback systems assure the user that the electronic device has detected the user's tactile input. Haptic feedback is particularly useful when the user is engaging in an activity that requires rapid tactile input (e.g., typing on a touch screen keyboard) so that the user can quickly determine whether each touch was detected.

Haptic feedback is generated by a vibration motor housed within the electronic device. A user may cause the vibration motor to begin vibrating by, e.g., touching the touch screen display. Once the vibration motor has begun vibrating, however, it cannot be stopped instantly. Instead, the vibration is gradually stopped over the course of a braking period during which a "brake" is applied to the vibration motor. The brake is applied to the motor until it has been determined that the vibration has stopped. Thus, accurately determining the time at which vibration stops is essential to stopping the braking period at an appropriate time.

SUMMARY

At least some of the embodiments disclosed herein are directed to a method for controlling haptic feedback in an electronic device, comprising: generating a series of braking pulses to stop vibrations generated by a vibration motor in the electronic device; during a high impedance period between at least one pair of pulses in said series of braking pulses, determining a rate of change of an induced voltage associated with the vibration motor; and if said rate of change meets a requirement, ceasing said generation of the series of braking pulses. Such embodiments may be supplemented in a variety of ways, including by adding any of the following concepts in any sequence and in any combination: wherein, during said high impedance period, the vibration motor is uncoupled from a voltage source used to generate said series of braking pulses; wherein the induced voltage is obtained from the vibration motor; wherein, during said high impedance period, the induced voltage indicates a degree of vibration generated by the vibration motor; wherein said at least one pair of braking pulses contains pulses of opposing polarity; wherein determining said rate of change of the induced voltage comprises using a counter to measure a length of time between a crossover time at which the induced voltage shifts polarity and a time at which the induced voltage encounters a hysteresis band trip point; wherein the rate of change is determined using a hysteresis comparator; wherein the electronic device comprises a wearable device, a tablet, or a smart phone.

At least some embodiments are directed to a system for controlling haptic feedback in an electronic device, comprising: a pulse source; and a vibration motor that receives braking pulses from the pulse source to decrease vibrations generated by the vibration motor, wherein the pulse source ceases providing said braking pulses to the vibration motor if a rate of change of an induced voltage associated with the vibration motor meets a requirement. Such embodiments may be supplemented in a variety of ways, including by adding any of the following concepts in any sequence and in any combination: wherein said braking pulses alternate polarity; wherein the induced voltage is obtained from the vibration motor during high impedance periods in which the vibration motor is electrically isolated from an associated voltage source; wherein each of the high impedance periods falls between a pair of said braking pulses; wherein the requirement reflects a rate of change of the induced voltage at which vibrations from the vibration motor cease; further comprising a hysteresis comparator used to determine said rate of change of the induced voltage; wherein the electronic device is a wearable device, a tablet, or a smart phone.

At least some embodiments are directed to a system for controlling haptic feedback in an electronic device, comprising: an H-bridge driver; a waveform generator coupled to the H-bridge driver that provides braking pulses of alternating polarity to the H-bridge driver; a vibration motor coupled to the H-bridge driver that provides haptic feedback to a user of the electronic device, the vibration motor receives said braking pulses when at least some switches on the H-bridge driver are closed; and a hysteresis comparator coupled to the vibration motor that receives an induced voltage from the vibration motor during a high-impedance period and is used to determine a rate of change of said induced voltage, wherein, if said rate of change meets a requirement, the waveform generator ceases to provide said braking pulses to the H-bridge driver. Such embodiments may be supplemented in a variety of ways, such as by including the following concepts in any sequence and in any combination: wherein, during the high impedance period, at least some of said switches on the H-bridge driver are open such that the vibration motor is electrically isolated from an associated voltage source; wherein the high impedance period falls between a pair of said braking pulses; wherein said braking pulses decrease vibrations generated by the vibration motor; wherein the electronic device is selected from the group consisting of: a wearable device, a tablet, and a smartphone.

BRIEF DESCRIPTION OF THE DRAWINGS

There are disclosed in the drawings and in the following description specific systems and methods for monitoring the slope of a vibration motor induced voltage to control haptic feedback. In the drawings.

Figure 1:
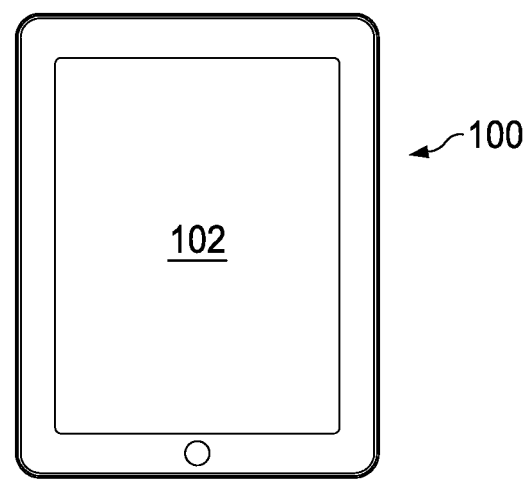
FIG. 1 is an illustration of an electronic device implementing the systems and methods disclosed herein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for controlling haptic feedback by monitoring the slope of an induced voltage produced by a vibration motor that generates the haptic feedback. A waveform generator generates driving pulses during a driving period that cause a vibration motor to vibrate in response to, e.g., tactile input received from a user of an electronic device. The waveform generator subsequently generates braking pulses during a braking period. In between each pair of braking pulses, an induced voltage associated with the vibration motor is provided to a hysteresis comparator. The comparator is used to determine the rate of change of the induced voltage. As the braking period progresses, the rate of change of the induced voltage will decrease each time that the induced voltage is sampled. When the rate of change meets a predetermined requirement, the waveform generator stops generating braking pulses, thus ending the braking period.

FIG. 1 is an illustration of an electronic device 100 implementing the systems and methods disclosed herein. The electronic device 100 includes any device in which haptic feedback would be suitable, such as and without limitation, wearable devices (e.g., augmented reality hardware like GOOGLE GLASS®, smart wrist watches such as the APPLE WATCH®), tablets (e.g., APPLE iPAD®, AMAZON KINDLE®, SAMSUNG GALAXY TAB®, MICROSOFT SURFACE®), and smart phones (e.g., SAMSUNG GALAXY NOTE®, APPLE iPHONE®). Other types of electronic devices are contemplated and included within the scope of the disclosure. The electronic device 100 includes a display 102, which, in at least some embodiments, is a touch screen display capable of receiving tactile input (e.g., using a finger). The electronic device 100 provides haptic feedback in response to the tactile input by generating vibrations palpable to the user.

Figure 2:
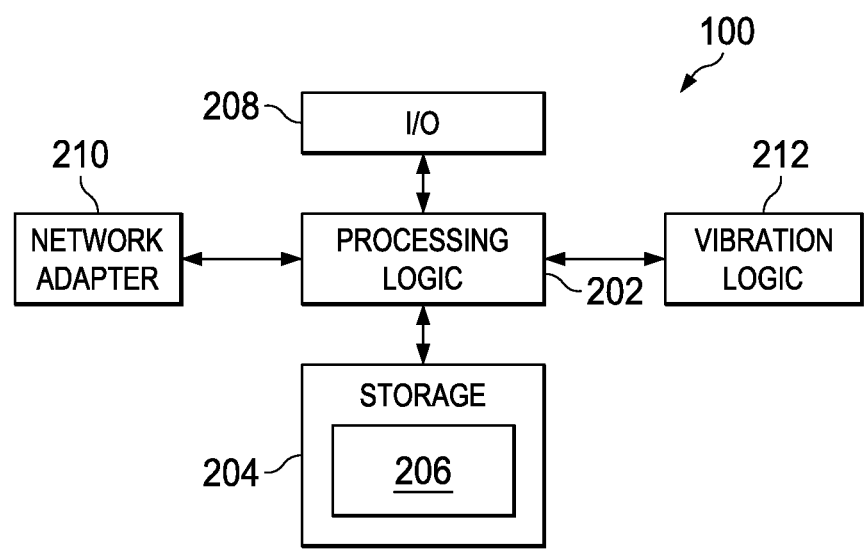
FIG. 2 is a block diagram of components housed within an electronic device implementing the systems and methods disclosed herein.

FIG. 2 is a block diagram of components housed within an illustrative electronic device 100 implementing the systems and methods disclosed herein. In particular, the electronic device 100 includes processing logic 202 such as a microprocessor; storage 204 (e.g., volatile or non-volatile memory); software code 206 (e.g., an operating system, various applications) stored on the storage 204; input/output devices and interfaces 208 (e.g., a touch screen display, buttons, microphone, speakers); a network adapter 210 that facilitates communications between the processing logic 202 and various remotely located devices, such as other computers and servers; and vibration logic 212, which contains circuit logic that performs at least some of the techniques disclosed herein. The vibration logic 212 is not necessarily self-contained, meaning that in some embodiments, all operations described herein relating to vibration may be performed by circuit logic within the vibration logic 212, while in other embodiments, some of these operations may be performed by circuit logic outside the vibration logic 212. In general, the vibration logic 212 is shown in FIG. 2 to explain that most or all of the techniques disclosed herein are performed by circuit logic housed somewhere within the electronic device 100. The components shown in FIG. 2 are not limiting. Other components and circuit logic may be included within the electronic device 100.

Figure 3:
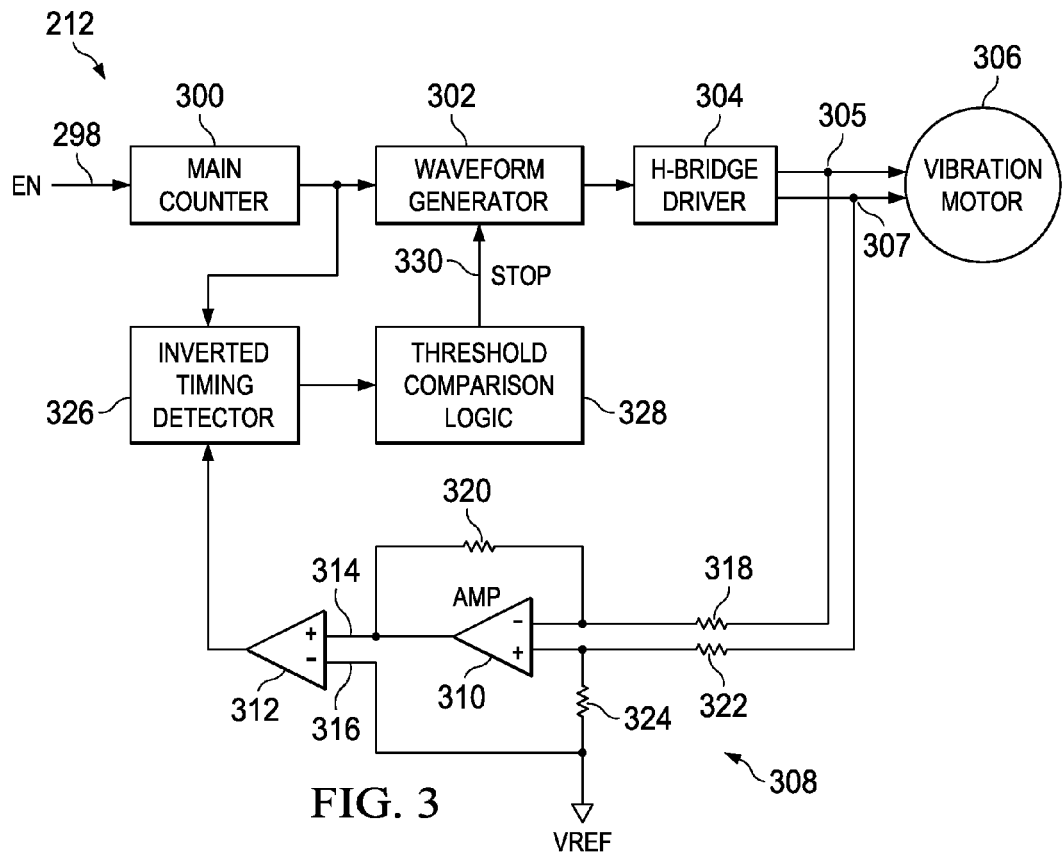
FIG. 3 is a block diagram of vibration logic components housed within an electronic device implementing the systems and methods disclosed herein.

FIG. 3 is a block diagram of illustrative components associated with the vibration logic 212. The components shown in FIG. 3 may be housed in the vibration logic 212, but the scope of disclosure is not limited to any particular arrangement or configuration of the components of FIG. 3 within the electronic device 100. More particularly, although FIG. 3 shows its components being housed within the vibration logic 212 in this manner, in some embodiments, some of the components shown in FIG. 3 are housed within vibration logic 212, while other components shown in FIG. 3 are housed elsewhere within the electronic device. Any such variations are contemplated and included within the scope of the disclosure.

Referring still to FIG. 3, the vibration logic 212 includes an enable signal (EN) 298; a main counter 300; a waveform generator 302; an H-bridge driver 304; a vibration motor 306; comparator logic 308 that includes: (1) a differential amplifier 310 having resistors 318, 320 coupled to an inverting input and resistors 322, 324 coupled to a non-inverting input, and (2) a hysteresis comparator 312 having a non-inverting input that couples to resistor 320 and the output of differential amplifier 310 at node 314, and an inverting input that couples to resistor 324 and a reference signal VREF at node 316; an inverted timing detector 326; and threshold comparison logic 328 that is capable of issuing a STOP signal 330 to the waveform generator 302. At node 305, the inverting input to the differential amplifier 310 couples to one of the leads by which the H-bridge driver 304 supplies voltage to the vibration motor 306, and at node 307, the non-inverting input to the differential amplifier 310 couples to the other lead by which the H-bridge driver 304 supplies voltage to the vibration motor 306. The output of the hysteresis comparator 312 is provided to the inverted timing detector 326, as shown. Although the specific circuit logic associated with each of the components of FIG. 3 is not shown, one of ordinary skill in the art will readily appreciate how to make and use such circuit logic after understanding the components' operations, as described herein. The overall operation of the vibration logic 212 is explained below. First, however, the contents of the vibration motor 306 and the H-bridge circuit 304 are described in greater detail in conjunction with FIGS. 4 and 5, respectively.

Figure 4:
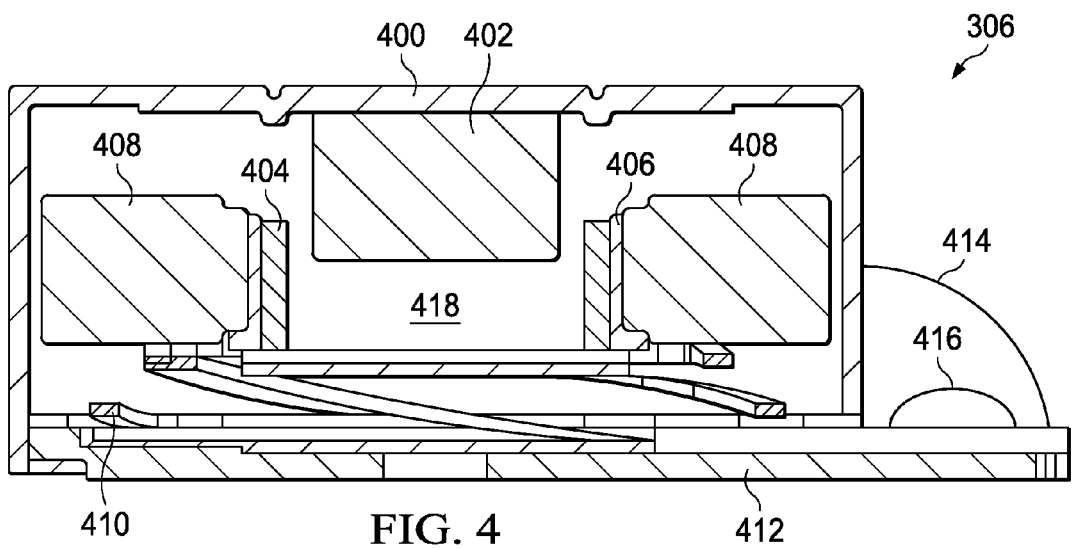
FIG. 4 is a cross-sectional view of a vibration motor associated with vibration logic.

FIG. 4 is a cross-sectional view of the vibration motor 306 of FIG. 3. Specifically, the vibration motor 306 includes a casing 400; a magnet 402; a coil 404 coupled to a yoke 406; a weight 408 coupled to the yoke 406; a spring 410 of any suitable type; and a bracket 412 that facilitates mounting of the vibration motor 306 within the electronic device 100. The coil 404 has two ends 414, 416. The end 414 couples to node 305 in FIG. 3, and the end 416 couples to node 307, although the reverse coupling scheme also may be used. The vibration motor 306 also includes adequate space 418 to permit free movement of the coil 404, yoke 406 and weight 408 without physically contacting the magnet 402. In operation, a voltage is applied across the ends 414, 416. This voltage generates a current in the coil 404, which, in turn, generates an electromagnetic field within the casing 400. The electromagnetic field interacts with the magnet 402, causing the coil 404, yoke 406 and weight 408 to move with respect to the magnet 402. The spring 410 enables such movement of the coil 404, yoke 406 and weight 408, and an adequate amount of space 418 permits such movement without collision. The polarity of the voltage applied across the coil ends 414, 416 may be alternated, thus causing the current in the coil 404 to repeatedly change direction. In turn, this alternating current in the coil 404 causes fluctuations in the electromagnetic field that result in the coil 404, yoke 406 and weight 408 repeatedly moving up and down in relation to the magnet 402, thus causing vibrations that can be felt by the user.

Figure 5:
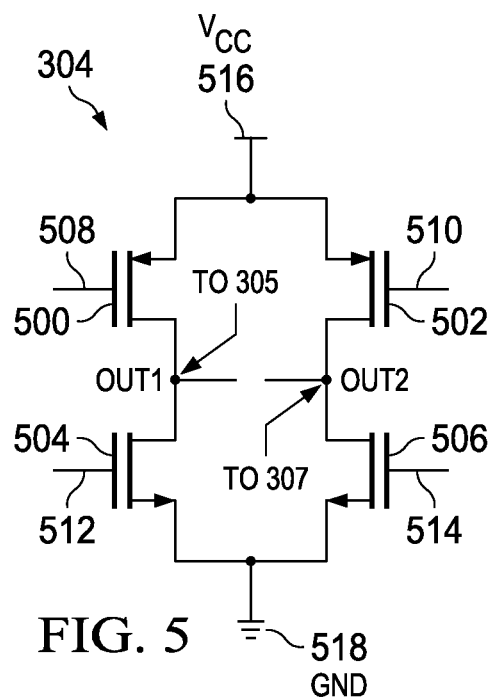
FIG. 5 is a schematic diagram of an H-bridge circuit associated with vibration logic.

FIG. 5 is a schematic diagram of the H-bridge circuit 304. The circuit 304 includes multiple switches 500, 502, 504, 506, which, in at least some embodiments, are implemented using transistors that are controlled by input nodes 508, 510, 512, 514, respectively. For instance, in some embodiments, the switches 500, 502 are p-channel transistors having sources that couple to a voltage supply rail 516 ($V_{CC}$); drains that couple to nodes 305, 307 (FIG. 3), respectively; and gates that couple to input nodes 508, 510, respectively. Similarly, in some embodiments, the switches 504, 506 are n-channel transistors having drains that couple to the nodes 305, 307, respectively; sources that couple to ground 518; and gates that couple to input nodes 512, 514, respectively. The signals applied at the gates 508, 510, 512, 514 cause their respective transistors to conduct or not conduct current, thereby enabling the transistors to act as switches.

In operation, when switches 500 and 506 are closed and switches 502 and 504 are open, the node 305 couples to $V_{CC}$ and node 307 couples to ground, thereby causing a voltage to be applied across nodes 305, 307. Similarly, when switches 500 and 506 are open and switches 502 and 504 are closed, the node 305 couples to ground and node 307 couples to $V_{CC}$, thereby causing a voltage of the opposite polarity to be applied across nodes 305, 307. By repeatedly opening and closing these pairs of switches, the polarity of the voltage applied across 305, 307 can be alternated. By coupling the coil ends 414, 416 of the vibration motor 306 (FIG. 4) to the nodes 305, 307 of the H-bridge circuit 304 (FIG. 5), the vibration motor 306 is driven to produce vibrations. The various electrical couplings described above, such as the coupling of switches 500, 504 to node 305 and switches 502, 506 to node 307 may be reversed as desired and as may be suitable. In addition, while an open pair of switches may be completely non-conducting, the closed pair of switches may be adjusted to conduct at varying degrees, as desired.

Figure 6A:
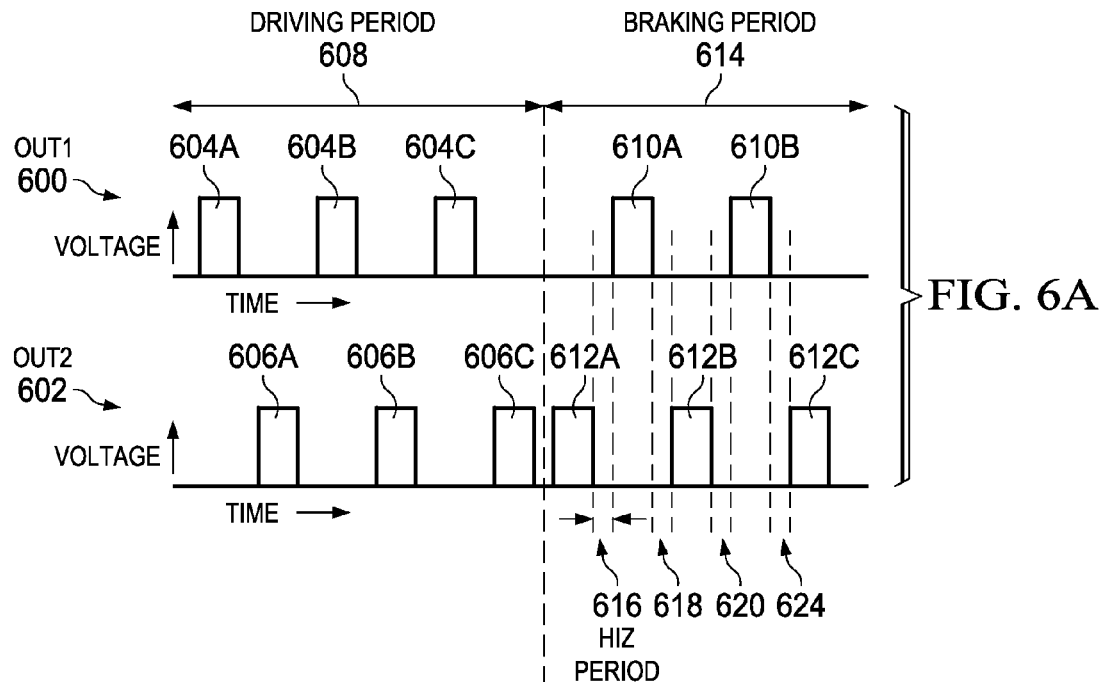
FIG. 6A is a pair of waveforms illustrating driving pulses and braking pulses.

FIG. 6A is a pair of waveforms 600, 602 illustrating pulses generated by the waveform generator 302 and the H-bridge circuit 304 (FIG. 3). Each of the waveforms 600, 602 is plotted with time on the x-axis and voltage on the y-axis. The waveform 600 describes voltage activity on the node 305, and the waveform 602 describes voltage activity on the node 307 (although, as explained earlier, such electrical couplings may be reversed when desired and appropriate). Thus, the waveforms 600, 602 are essentially acting upon the nodes 305, 307 with opposing polarities. As shown in each of the waveforms 600, 602, the waveform generator 302 generates pulses during a driving period 608 and during a braking period 614. Pulses generated during the driving period 608 are driving pulses, and pulses generated during the braking period 614 are braking pulses. Driving pulses cause the vibration motor 306 to vibrate, whereas braking pulses cause the vibration motor 306 to stop vibrating. Generally, both the increase of vibration intensity (during the driving period 608) and the decrease of vibration intensity (during the braking period 614) are gradual processes. Stated another way, the vibration intensity at the end of the driving period 608 is likely to be greater than that at the beginning of the driving period 608, and the vibration intensity at the end of the braking period 614 is likely to be less than that at the beginning of the braking period 614.

The waveform 600 includes driving pulses 604A, 604B, and 604C. The waveform 602 includes driving pulses 606A, 606B, and 606C. Each of the driving pulses 604A-C is applied at node 305 (FIG. 5), and each of the driving pulses 606A-C is applied at node 307 (FIG. 5). When pulses 604A-C are applied to node 305, node 307 is coupled to ground. Similarly, when pulses 606A-C are applied to node 307, node 305 is coupled to ground. In this way, the driving pulses of the waveforms 600, 602 illustrate the alternating nature of the voltage applied across the nodes 305, 307. This alternating voltage is responsible for causing vibrations in the vibration motor 306, as explained above. As the alternating pulses shown in waveforms 600, 602 continue to be applied across nodes 305, 307, the vibrations in the vibration motor 306 continue to increase in intensity (e.g., magnitude) until they reach steady state. The driving period 608 is illustrated in an abbreviated form in FIG. 6A, but in practice, the driving period 608 continues as long as may be necessary and suitable.

The waveforms 600, 602 also include a braking period 614. In the braking period 614, just as in the driving period 608, alternating voltages are applied across the nodes 305, 307. However, in the braking period, the timing with which the alternating voltages are applied across the nodes is inverted such that each pulse now counteracts vibration in the vibration motor 306. During the braking period 614, braking pulses 610A-B are applied to node 305, and braking pulses 612A-C are applied to node 307. Although FIG. 6A only shows five braking pulses, in practice, the braking period 614 continues until vibrations diminish to an acceptable level, as described below.

As explained above with respect to FIG. 5, opening and closing the switch pairs 500, 506 and 502, 504 causes the alternating voltages shown in FIG. 6A to be applied across nodes 305, 307 (and thus across coil ends 414, 416 of the vibration motor 306). This causes vibration or braking. Between each pair of pulses shown in waveforms 600, 602, however, there exists a high impedance period (or "HiZ period") during which all switches 500, 502, 504, 506 of the H-bridge circuit 304 are open. Thus, during the high impedance period, the nodes 305, 307 (and, by extension, the vibration motor 306) are electrically isolated from the voltage source 516 and ground 518. FIG. 6A denotes such high impedance periods (during the braking period 614) with numerals 616, 618, 620 and 624. Electrically isolating the vibration motor 306 in this manner, however, does not instantly stop vibration. Even after the vibration motor 306 is cut off from its power source, it continues to vibrate for a time due to residual kinetic energy. This residual vibration induces a voltage across the nodes 305, 307. The swing of this voltage, called the "induced voltage," indirectly reflects the degree of vibration being generated by the vibration motor 306. A more rigorous vibration (typically found immediately after the vibration motor 306 is electrically isolated from $V_{CC}$ 516) results in voltage swings that are greater, while a milder vibration (typically found a later time after the vibration motor 306 is electrically isolated from $V_{CC}$ 516) results in voltage swings that are lesser. Because high impedance periods are similar or equal in duration, the rate of change (or "slope") of the induced voltage is another measure of the degree of vibration present.

Figure 6B:
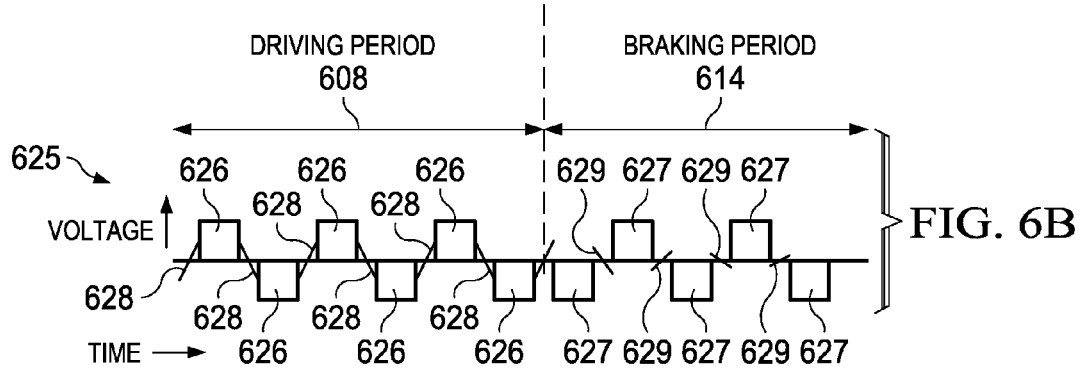
FIG. 6B is a waveform that illustrates variations in induced voltage swings as driving and braking pulses are applied.

FIG. 6B illustrates this variation in induced voltage swings as driving and braking pulses are applied. Specifically, FIG. 6B shows a waveform 625 comprising the driving period 608 and the braking period 614. During the driving period 608, alternating, driving pulses 626 are applied to the vibration motor, resulting in high impedance period induced voltages 628 that consistently have large swings and rates of change. During the braking period 614, alternating, braking pulses 627 are applied to the vibration motor, resulting in high impedance period induced voltages 629 that gradually diminish in swing and rate of change. This is because the induced voltage swing and rate of change are functions of the degree of vibration in the motor. As the braking pulses diminish vibration, the induced voltage diminishes in swing and rate of change.

Figure 6C:
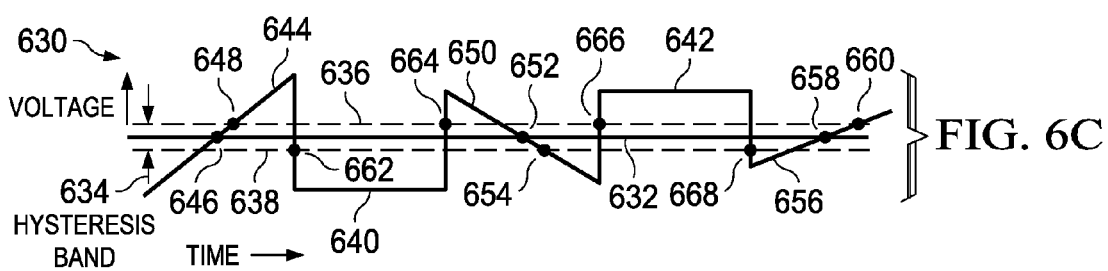
FIG. 6C is a waveform illustrating an induced voltage with a diminishing rate of change.

FIG. 6C is a more detailed waveform 630 illustrating induced voltage swings and rates of change during high impedance periods between braking pulses. In particular, the waveform 630 includes braking pulses 640 and 642 of opposite polarity, and it further includes induced voltage signals 644, 650, 656 during high impedance periods before, after and in between the braking pulses 640, 642. As shown, with the application of each successive braking pulse to the vibration motor, the swing and rate of change of the induced voltage signals are diminished—that is, the induced voltage signal 650 has a lower rate of change than the induced voltage signal 644, and the induced voltage signal 656 has a lower rate of change than the induced voltage signal 650. This flattening slope indicates a diminishing vibration due to the application of braking pulses.

The overall operation of the vibration logic 212 (FIG. 3) is now described in tandem with FIG. 6C. The enable signal (EN) 298 is applied to the main counter 300, which causes the main counter 300 to generate a counter signal that is provided to the waveform generator 302 and the inverted timing detector 326. The waveform generator 302 uses the counter signal to open and close the switches in the H-bridge driver 304 (e.g., switches 500, 502, 504, 506 shown in FIG. 5), thereby causing alternating polarity pulses to be applied across the nodes 305, 307. (Because both the waveform generator 302 and the H-bridge driver 304 facilitate the generation of pulses, the term "pulse source" may be used to refer to either or both of them.) Whether the generated pulses are driving pulses or braking pulses depends on the timing with which the switches in the H-bridge driver 304 are opened and closed, as described with reference to FIG. 6A above. Driving and braking pulses applied across the nodes 305, 307 by the H-bridge driver 304 are provided to the vibration motor 306. Driving pulses cause the vibration motor 306 to increase in vibration intensity (or maintain steady state), whereas braking pulses cause the vibration motor 306 to decrease in vibration intensity.

As explained above, the braking period includes multiple high impedance periods during which all switches in the H-bridge driver 304 are open, thus electrically isolating the vibration motor 306 from the voltage source associated with the H-bridge driver 304 (e.g., $V_{CC}$ 516 in FIG. 5). During such high impedance periods, an induced voltage from the vibration motor 306 is provided across the nodes 305, 307. The induced voltage is provided to comparator logic 308. The voltage is amplified by differential amplifier 310, which outputs the amplified voltage at node 314. The hysteresis comparator 312, therefore, receives as inputs an amplified version of the induced voltage at node 314 and a reference voltage $V_{REF}$ at node 316.

Because the comparator 312 is a hysteresis comparator, it is associated with two different trip points. These trip points are induced voltage values at which the comparator output changes state. One of the trip points is tripped if it is exceeded by the induced voltage while the induced voltage is rising, and the other trip point is tripped if it exceeds the induced voltage while the induced voltage is falling. FIG. 6C shows illustrative trip points that the hysteresis comparator 312 may implement. Specifically, FIG. 6C includes trip points 636, 638. If the induced voltage signal is increasing and it exceeds the trip point 636, the output of the comparator 312 changes state. Conversely, if the induced voltage signal is decreasing and it falls below the trip point 638, the output of the comparator 312 again changes state. The trip points 636, 638 may be set at least in part using $V_{REF}$ as known to one of ordinary skill, and they may be set to achieve a desired width of the hysteresis band 634. FIG. 6C also includes a midpoint 632, which may in some embodiments be equivalent to 0.0 Volts. As the induced voltage signal 644 increases, it exceeds trip point 636 at point 648, causing the comparator 312 to change output state. Similarly, as the induced voltage signal 650 decreases, it falls below trip point 638 at point 654, again causing the comparator 312 to change output state. Likewise, as the induced voltage 656 increases, it exceeds the trip point 636 at point 660, causing the comparator 312 to change output state. Although the output of the comparator 312 will also change state with pulse 640 (e.g., at points 662, 664) and pulse 642 (e.g., at points 666, 668), the vibration logic 212 may be designed to ignore these changes in state, as they do not reflect vibration activity.

Still referring to FIG. 3, the output of the hysteresis comparator 312 is provided to the inverted timing detector 326. The detector 326 uses the main counter 300 to determine the amount of time that elapses between each change of comparator output state and the preceding crossover in induced voltage polarity (the preceding crossover point is determined by using the main counter 300 and identifying the midpoint of the current high impedance period). For example, referring to both FIGS. 3 and 6C, the inverted timing detector 326 uses the main counter 300 to determine the amount of time that elapses between polarity crossover point 646 and the point 648 at which the induced voltage signal 644 exceeds the trip point 636. This amount of time reflects the slope of the induced voltage signal 644—that is, the rate of change of the induced voltage signal 644. Similarly, the timing detector 326 uses the main counter 300 to determine the amount of time that elapses between polarity crossover point 652 and the point 654 at which the induced voltage signal 650 falls below the trip point 638. This amount of time reflects the rate of change of the induced voltage signal 650. The same time measurement is performed between points 658, 660 for induced voltage signal 656. These three time measurements exhibit successive increases in length, thus indicating that the rate of change of the induced voltage signal 650 is less than that of induced voltage signal 644, and that the rate of change of the induced voltage signal 656 is less than that of induced voltage signal 650. This successive decrease in rates of change across induced voltage signals 644, 650, 656 demonstrates a decrease in vibration intensity in the vibration motor 306.

Still referring to FIG. 3, the threshold comparison logic 328 receives data from the inverted timing detector 326 indicating the rate of change for each of the induced voltage signals. When the threshold comparison logic 328 determines that an induced voltage rate of change has been achieved that meets a predetermined requirement (e.g., a threshold), it sends a STOP signal 330 to the waveform generator 302, causing the waveform generator 302 to stop generating braking pulses.

Figure 7:
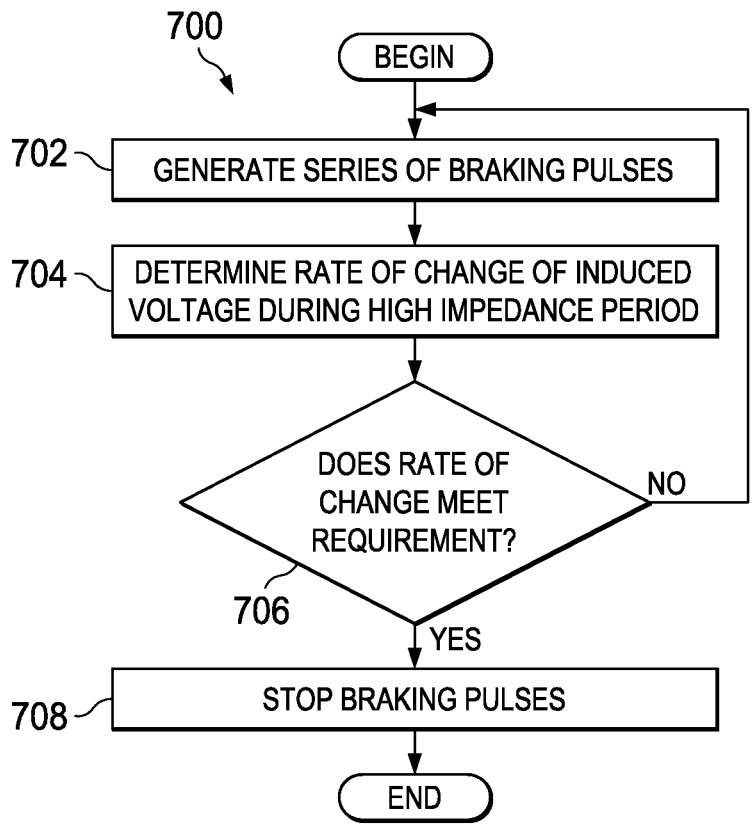
FIG. 7 is a flow diagram of a method in accordance with embodiments.

FIG. 7 is a flow diagram of a method 700 in accordance with embodiments. The method 700 begins with generating a series of braking pulses (step 702). The method 700 then comprises determining a rate of change of an induced voltage during a high impedance period between a pair of braking pulses (step 704). If the rate of change that is determined during step 704 does not meet a predetermined requirement (step 706), control of the method 700 returns to step 702. Otherwise, if the rate of change determined during step 704 meets the predetermined requirement (step 706), the method 700 includes stopping the braking pulses (step 708). The method is then complete. The scope of disclosure is not limited to the particular steps shown in method 700. Other steps may be added or deleted, as suitable.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A method for controlling haptic feedback in an electronic device, comprising:
   generating a series of braking pulses to stop vibrations generated by a vibration motor in the electronic device;
   during a high impedance period between at least one pair of pulses in said series of braking pulses, determining a rate of change of an induced voltage associated with the vibration motor; and
   if said rate of change meets a requirement, ceasing said generation of the series of braking pulses.

2. The method of claim 1, wherein, during said high impedance period, the vibration motor is uncoupled from a voltage source used to generate said series of braking pulses.

3. The method of claim 1, wherein the induced voltage is obtained from the vibration motor.

4. The method of claim 1, wherein, during said high impedance period, the induced voltage indicates a degree of vibration generated by the vibration motor.

5. The method of claim 1, wherein said at least one pair of braking pulses contains pulses of opposing polarity.

6. The method of claim 1, wherein determining said rate of change of the induced voltage comprises using a counter to measure a length of time between a crossover time at which the induced voltage shifts polarity and a time at which the induced voltage encounters a hysteresis band trip point.

7. The method of claim 1, wherein the rate of change is determined using a hysteresis comparator.

8. The method of claim 1, wherein the electronic device comprises a wearable device, a tablet, or a smart phone.

9. A system for controlling haptic feedback in an electronic device, comprising:
   a pulse source; and
   a vibration motor that receives braking pulses from the pulse source to decrease vibrations generated by the vibration motor,
   wherein the pulse source ceases providing said braking pulses to the vibration motor if a rate of change of an induced voltage associated with the vibration motor meets a requirement.

10. The system of claim 9, wherein said braking pulses alternate polarity.

11. The system of claim 9, wherein the induced voltage is obtained from the vibration motor during high impedance periods in which the vibration motor is electrically isolated from an associated voltage source.

12. The system of claim 11, wherein each of the high impedance periods falls between a pair of said braking pulses.

13. The system of claim 9, wherein the requirement reflects a rate of change of the induced voltage at which vibrations from the vibration motor cease.

14. The system of claim 9, further comprising a hysteresis comparator used to determine said rate of change of the induced voltage.

15. The system of claim 9, wherein the electronic device is a wearable device, a tablet, or a smart phone.

16. A system for controlling haptic feedback in an electronic device, comprising:
   an H-bridge driver;
   a waveform generator coupled to the H-bridge driver that provides braking pulses of alternating polarity to the H-bridge driver;
   a vibration motor coupled to the H-bridge driver that provides haptic feedback to a user of the electronic device, the vibration motor receives said braking pulses when at least some switches on the H-bridge driver are closed; and
   a hysteresis comparator coupled to the vibration motor that receives an induced voltage from the vibration motor during a high-impedance period and is used to determine a rate of change of said induced voltage,
   wherein, if said rate of change meets a requirement, the waveform generator ceases to provide said braking pulses to the H-bridge driver.

17. The system of claim 16, wherein, during the high impedance period, at least some of said switches on the H-bridge driver are open such that the vibration motor is electrically isolated from an associated voltage source.

18. The system of claim 16, wherein the high impedance period falls between a pair of said braking pulses.

19. The system of claim 16, wherein said braking pulses decrease vibrations generated by the vibration motor.

20. The system of claim 16, wherein the electronic device is selected from the group consisting of: a wearable device, a tablet, and a smartphone.

* * * * *